United States Patent [19]
Watanabe et al.

[11] Patent Number: 5,471,312
[45] Date of Patent: Nov. 28, 1995

[54] AUTOMATIC CALIBRATION METHOD

[75] Inventors: Atsushi Watanabe; Fumikazu Terawaki; Fumikazu Warashina, all of Oshino, Japan

[73] Assignee: Fanuc Ltd., Minamitsuru, Japan

[21] Appl. No.: 975,557

[22] PCT Filed: Jul. 6, 1992

[86] PCT No.: PCT/JP92/00851

§ 371 Date: Feb. 19, 1993

§ 102(e) Date: Feb. 19, 1993

[87] PCT Pub. No.: WO93/01029

PCT Pub. Date: Jan. 21, 1993

[30] Foreign Application Priority Data

Jul. 4, 1991 [JP] Japan ..................... 3-189525

[51] Int. Cl.$^6$ ..................... H04N 1/21
[52] U.S. Cl. ..................... 358/296; 347/256
[58] Field of Search ..................... 346/1.1, 108, 160; 382/22, 23, 21, 15, 16; 358/296; 347/256

[56] References Cited

U.S. PATENT DOCUMENTS

| | | | |
|---|---|---|---|
| 4,581,762 | 4/1986 | Lapidus et al. | 382/22 |
| 5,274,714 | 12/1993 | Hutcheson et al. | 382/15 |

FOREIGN PATENT DOCUMENTS

| | | |
|---|---|---|
| 0114505 | 8/1984 | European Pat. Off. . |
| 0151417 | 8/1985 | European Pat. Off. . |
| 0301527 | 2/1989 | European Pat. Off. . |
| 63-62003 | 3/1988 | Japan . |
| 63-180486 | 7/1988 | Japan . |
| 63-254575 | 10/1988 | Japan . |

OTHER PUBLICATIONS

Proceedings of the 1991 IEEE International Conference on Robotics and Automation, Sacramento, Calif., US, 9–11 Apr. 1991, Los Alamitos, Calif., US, pp. 2079–2084, XP221068, B. Preising & T. C. Hsia "Robot Performance Measurement and Calibration Using a 3D Computer Vision System".

International Journal of Robotics Research, vol. 9, No. 4, Aug. 1990, Cambridge Mass., US, pp. 22–39, XP174623, S. B. Skaar, W. H. Brockman & W. S. Jang, "Three-Dimensional Camera Space Manipulation".

Primary Examiner—Mark J. Reinhart
Attorney, Agent, or Firm—Staas & Halsey

[57] ABSTRACT

A method for automatically effecting calibration between an image processing apparatus and a control device of an automatic machine. Jig data for calibration and the position of a robot, fitted with a jig which can be photographed by a camera at the time of calibration, are previously given as instructions. In response to a calibration command, the robot, fitted with the jig, moves to a point of instruction, the image processing apparatus photographs the jig and fetches an image after the movement. A calibration process is executed in accordance with data of the photographed image, set jig data, and robot position. When the jig data and the instruction point are first set and given once as instructions, the calibration thereafter can be automatically effected only by mounting the jig on the robot and inputting the calibration command.

9 Claims, 3 Drawing Sheets

AUTOMATIC CALIBRATION METHOD

TECHNICAL FIELD

The present invention relates to a calibration method essential to a system for the control of an automatic machine, such as a robot, in which an object of operation is detected by means of an external visual sensor, such as an image processing apparatus, and the operating position of the automatic machine is corrected.

BACKGROUND ART

Conventionally known is a system in which an image processing apparatus is utilized as a visual sensor for an automatic machine, such as a robot, so that the deviations of the position and attitude of the object of operation detected by means of the image processing apparatus are detected. The data indicative of these deviations of the position and attitude are delivered as correction data to a control device of the automatic machine; and the control device of the automatic machine performs a specified operation while correcting the operating position in accordance with the correction data. In this case, the operation for the position correction cannot be performed normally unless a coordinate system for an image of the object of operation to be detected by the image processing apparatus and a coordinate system for the operation of the automatic machine are integrated. Accordingly, a process is needed to combine the respective coordinate systems of the image processing apparatus and the control device of the automatic machine.

In order to correct the operation of the automatic machine, such as a robot, in accordance with the correction data indicative of the deviations of the position and attitude of the object of operation detected by the image processing apparatus, it is necessary to transform pixel value data (data in a camera coordinate system) on the image, picked up by a camera of the image processing apparatus, into data in a sensor coordinate system, which is common to the image processing apparatus and the control device of the automatic machine, and also into data in a work coordinate system for the actual drive control of the automatic machine. These coordinate transformations for the data require previous definitions of the respective coordinate axes of the individual coordinate systems. In general, this series of operations is referred to as calibration.

The calibration work comprises operations including:

(1) setting on the visual sensor side and data setting essential to the coordinate definitions;

(2) coordinate definition for the visual sensor;

(3) coordinate definition for the control device of the robot (automatic machine); and (4) combining the coordinates for the visual sensor and the robot control device.

In executing two-dimensional calibration associated with the image processing apparatus and the robot, for example, the image processing apparatus combines the camera coordinates and sensor coordinates (operations (1) and (2) of the calibration work) by setting the positional relationships between the camera coordinate axis and the sensor coordinates, axis names of the sensor coordinates, pixel size, etc., and then defines the work coordinates for the robot operation (coordinate definition on the robot side described in (3)).

In the aforesaid operation (4), a body which can be recognized by the image processing apparatus, e.g., a jig with a circular object thereon, is first prepared for use and mounted on the robot. Then, the jig on the robot is moved to the origin of the sensor coordinates recognized by the image processing apparatus, and its position (position with respect to the work coordinates for the robot) is stored in the control device of the robot. Then, the robot is moved to specified points on the X and Y axes of the sensor coordinates, and the respective positions of these points are stored individually. Subsequently, these stored data are displayed on a display unit on the robot side, and their respective values are entered in the image processing apparatus. Thereupon, the relationships between the work coordinates for the robot and the sensor coordinates are obtained, and the sensor coordinates recognized by the robot are squared with the sensor coordinates recognized by the image processing apparatus to complete the calibration work.

This calibration work is a highly expert task, which requires very high accuracy and complicated operation processes.

Known examples of this calibration work, besides the aforementioned two-dimensional calibration, include three-dimensional calibration such that a three-dimensional position is detected by picking up the object of operation by three cameras. Also known is a method in which the two- and three-dimensional calibrations are effected by using dot patterns.

Normally, the calibration work described above need not be repeated if it has been executed once during the construction of the work system including the image processing apparatus, robot, etc.

If errors increase for any reasons, such as deviation of the camera, change of the optical environment, etc., the calibration should be executed again. In this case, the operations (1) to (4) of the calibration work must be repeated, thus requiring time, labor, and service of an expert.

DISCLOSURE OF THE INVENTION

An object of the present invention is to provide a method for automatically effecting the aforesaid calibration.

The present invention comprises steps of: previously giving the automatic machine an instruction point for a position of an automatic machine where the whole body of a jig mounted on the automatic machine comes within the range of a camera of the image processing apparatus, and previously setting, in the image processing apparatus, data of an object of recognition attached to the jig; mounting the jig on the automatic machine and issuing a calibration start command to actuate the image processing apparatus and the automatic machine; moving the automatic machine to the instruction point and photographing the jig by the camera while maintaining communication between the image processing apparatus and the automatic machine in accordance with a predetermined program; and combining camera coordinates, sensor coordinates, and work coordinates of the automatic machine in accordance with image data obtained by the photographing, data of the object of recognition on the jig, and the position of the automatic machine.

Data of transformation from the camera coordinates to the sensor coordinates is obtained in accordance with the image data obtained by the photographing and the data on the jig. Further, data of transformation from the sensor coordinates to the position of the work coordinates of the automatic machine is obtained in accordance with the position of the automatic machine in which the jig is photographed. Thus, the camera coordinates, sensor coordinates, and work coordinates are combined, and the calibration is effected automatically.

BEST MODE OF CARRYING OUT THE INVENTION

Figure 2:
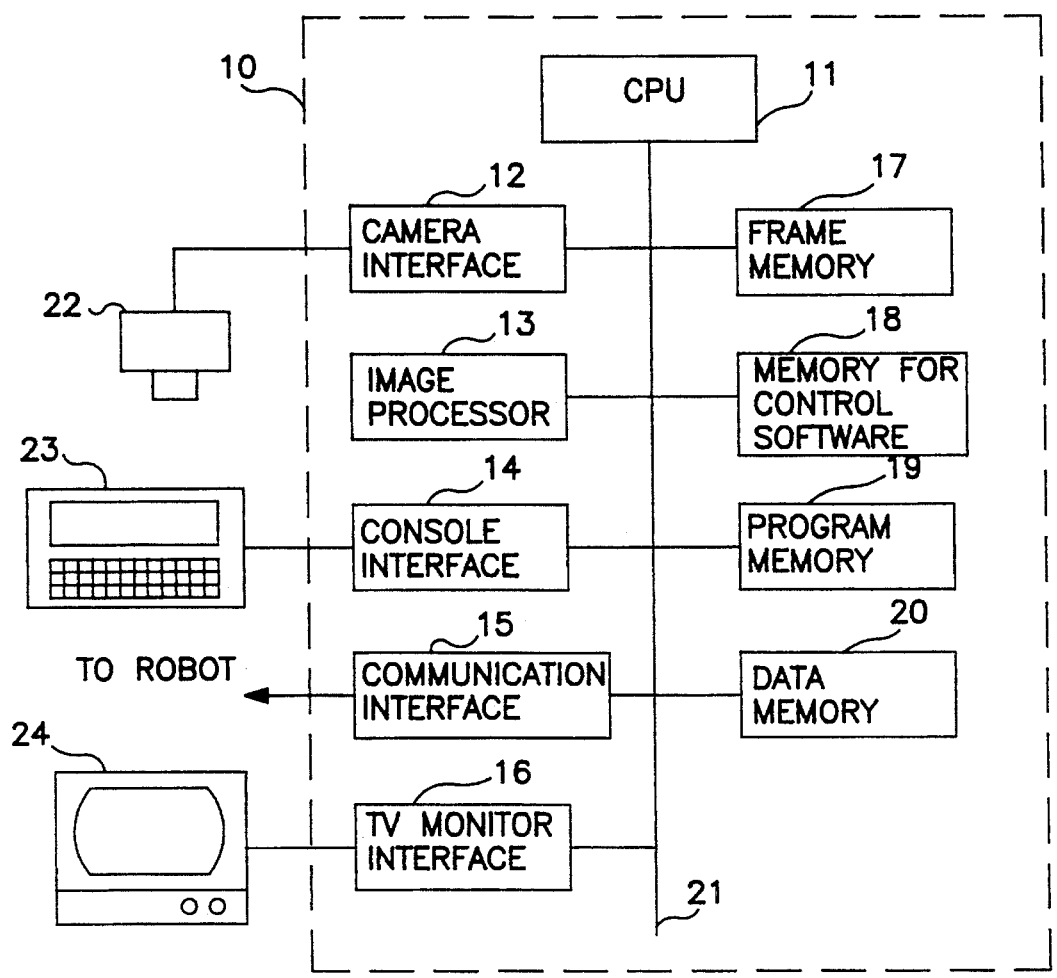
FIG. 2 is a block diagram showing the principal part of the image processing apparatus for carrying out the method of the present invention.

In FIG. 2, central image processing apparatus 10 comprises a main central processing unit (main CPU) 11 which is connected, by of a bus 21, to a camera interface 12, an image processor 13, a console interface 14, a communication interface 15, a TV monitor interface 16, a frame memory 17, a memory 18 for control software formed of a ROM, a program memory 19 formed of a RAM or the like, and a data memory 20 formed of a nonvolatile RAM.

The camera interface 12 is connected to cameras 22 (up to 8 in total, only one of which is shown in FIG. 2) for photographing parts or other objects. An image of an object picked up in the range of one of the cameras 22 is transformed into a gradation image by means of a gray scale, and loaded into the frame memory 17.

The image processor 13 processes the image stored in the frame memory 17, discriminates the object, and determines its position and attitude.

The console interface 14 is connected to a console 23. The console 23 has various command keys, numeric keys for the entry, editing, registration, and execution of application programs, etc., as well as a liquid crystal display unit. The liquid crystal display unit can display menus for setting various data, program lists, etc. The memory 18 for control software is loaded with control programs for controlling a visual sensor system by means of the main CPU 11, while the program memory 19 is loaded with programs created by a user.

The communication interface 15 is connected to an automatic machine, such as a robot, which uses the visual sensor system. Also, the TV monitor interface 16 is connected to a monitor TV 24 for displaying the image picked up by camera 22.

The above arrangement resembles the arrangement of a conventional visual sensor system. The system according to the present invention, however, differs from the conventional visual sensor system in that the memory 18 for control is loaded with programs for automatic calibration, which will be described later.

Figure 3:
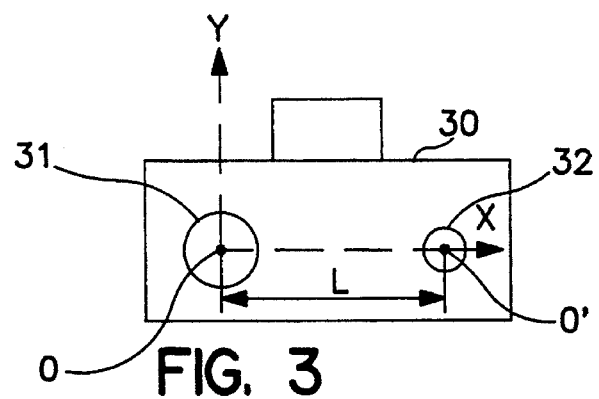
FIG. 3 is a diagram for illustrating an example of a two-dimensional calibration jig.

FIG. 3 shows a jig 30 for two-dimensional regular calibration and dot-pattern calibration to be used in the present embodiment. The jig 30 is provided with a large circle 31 and a small circle 32. In FIG. 3, the origin O corresponds to the center of the large circle 31; the X axis is given by a straight line which connects the respective centers O and O' of the large and small circles 31 and 32 (direction from center O to center O' is positive), and the Y axis is an axis obtained by rotating the X axis 90° in the counterclockwise direction. Further, pixel scale data is given by the distance L between the respective centers O and O' of the two circles.

Figure 4:
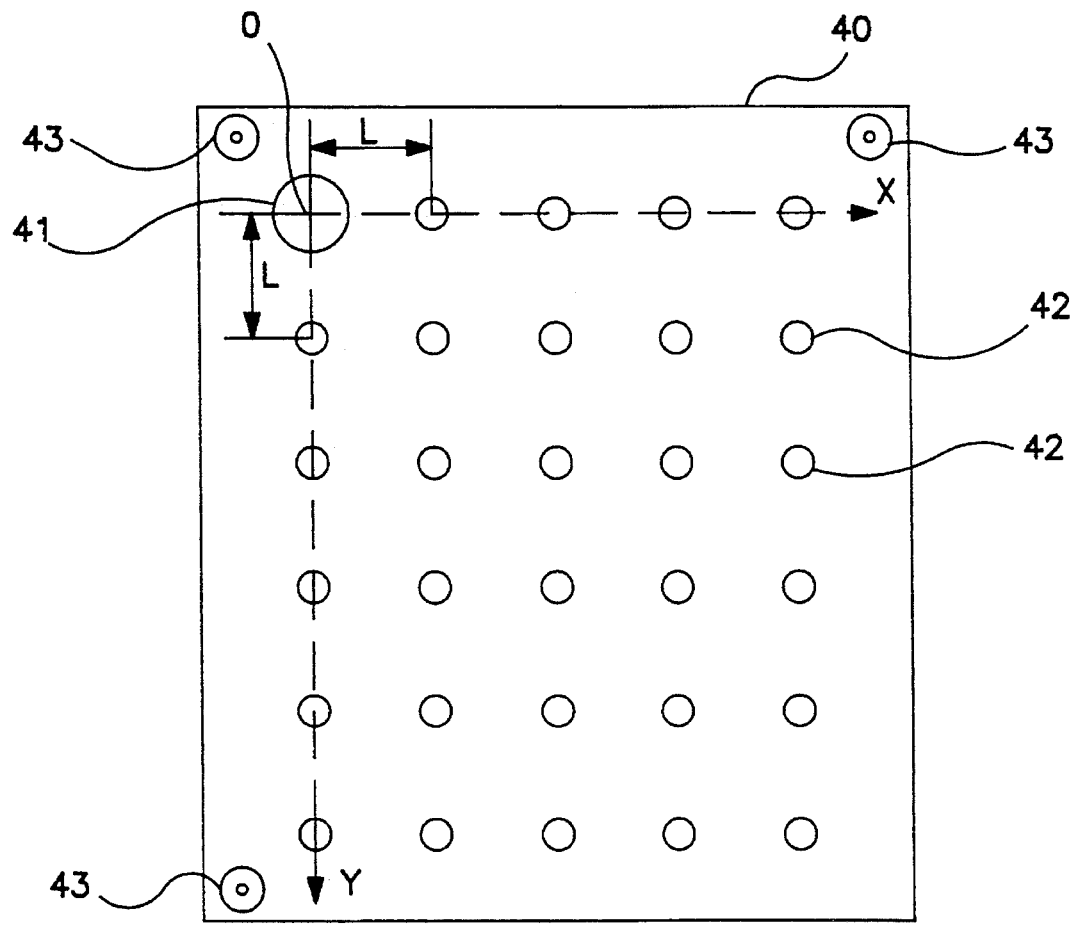
FIG. 4 is a diagram for illustrating an example of a three-dimensional calibration jig.

FIG. 4 shows an example of a jig 40 for three-dimensional regular calibration and dot-pattern calibration. In this jig 40, a large circle 41 is disposed around a position corresponding to the origin O of sensor coordinates, and n number of small circles 42 and m number of small circles 42 are arranged at regular intervals L in the X- and Y-axis directions, respectively, thus forming a lattice. Pins 43 are arranged individually at three corner portions to extend at right angles to the XY plane.

Referring now to the flow chart of FIG. 1, a method for calibration using the jigs 30 and 40 will be described. First, programs for processes of Steps S1 to S17 to be executed by the image processing apparatus 10 are previously registered in a program memory 19 of the image processing apparatus shown in FIG. 2, and programs for processes (Steps T1 to T10) of FIG. 1 to be executed by a robot are previously registered in a memory in a control device of the robot. Then, the following setting processes (I) to (III) are executed only for the first calibration after the construction of the system.

(I) The camera to be used is set in the image processing apparatus 10.

This setting, like the conventional calibration, is made according to the connector number of the camera interface 12 which is connected to the camera to be used.

(II) Data on the calibration jig are set in the image processing apparatus.

If the calibration is two-dimensional, the distance L between the respective centers of the circles 31 and 32 of the jig 30 is set. If the calibration is three-dimensional, the distance L between the circles 42 of the three-dimensional jig 40, which are arranged in the form of a lattice, the number n of the circles with respect to the X-axis direction, and the number m of the circles with respect to the Y-axis direction are set.

(III) The calibration jig is attached to the robot, and a position (position in a work coordinate system of the robot) such that the whole jig is in the range of the camera 22 is given as an instruction to the robot.

In the case of the three-dimensional calibration, the positions are given as instructions to the individual cameras (three cameras) to be used. Further, the mounting position and attitude of the three-dimensional calibration jig 40, relative to the robot, are given as instructions to the robot by locating the respective top portions of the three pins 43 of the jig 40 in specific points, individually.

These individual data are set and stored in the data memory 20 of the image processing apparatus and the memory of the robot control device.

Figure 1:
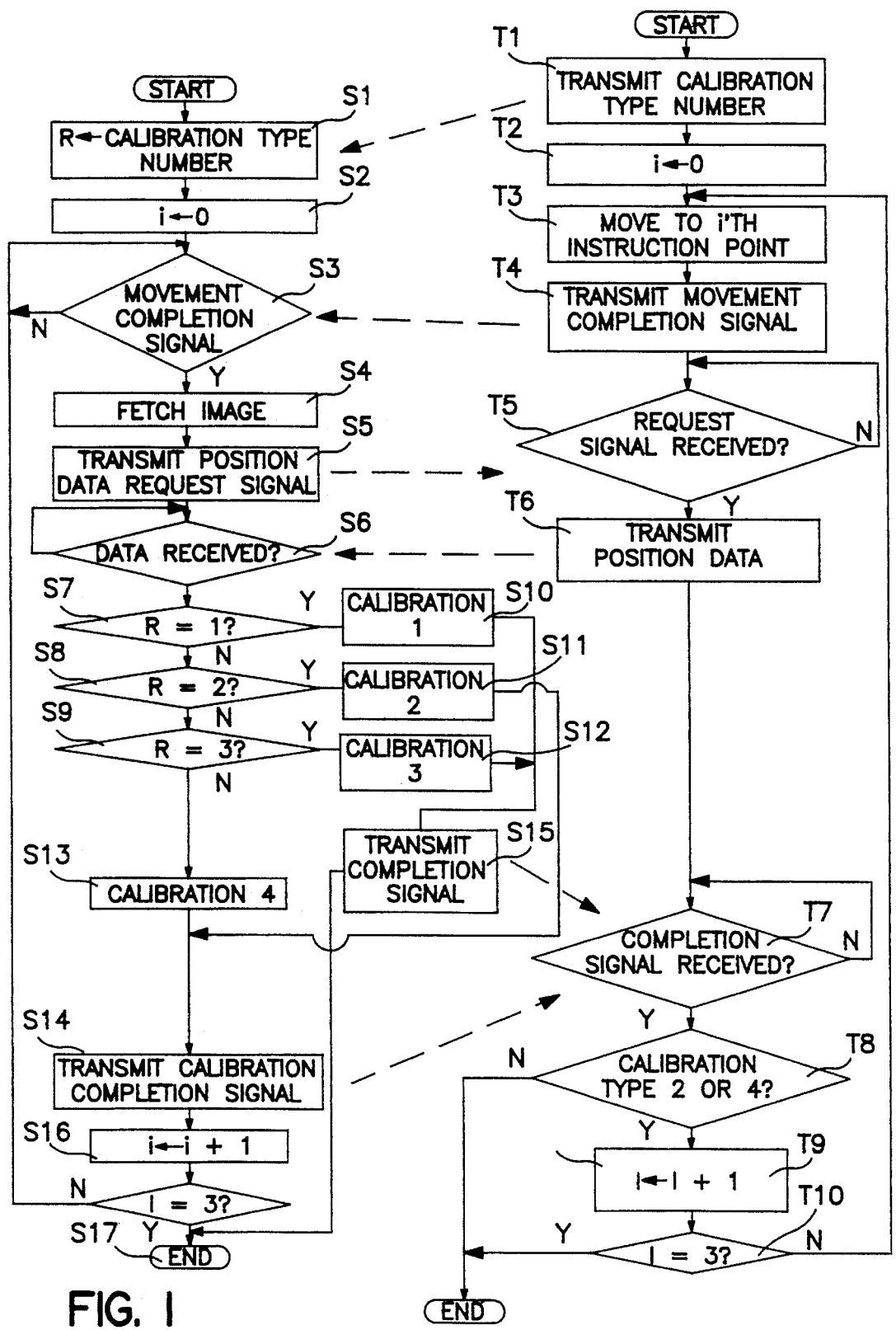
FIG. 1 is a flow chart showing an automatic calibration process to be executed by means of an image processing apparatus and a control device of a robot according to a method of the present invention.

When the type of calibration and a calibration command are delivered as inputs to the image processing apparatus or the control device of the robot after attaching the calibration jig to be used to the robot, the CPU 11 of the image processing apparatus 10 and a processor of the robot control device start the processings shown in the flow chart of FIG. 1, individually.

In the present embodiment, set types of calibration include Type 1 or two-dimensional regular calibration, Type 2 or three-dimensional regular calibration, Type 3 or two-dimensional dot-pattern calibration, and Type 4 or three-dimensional dot-pattern calibration. Also given next is a case where a calibration start command is inputted from the control device of the robot.

First, in Step T1, the processor of the robot control device loads its register with an inputted calibration type number, and transmits the calibration type number and the calibration start signal to the image processing apparatus. On receiving the calibration start signal from the robot control device, the CPU 11 of the image processing apparatus 10 loads a register R with the received calibration type number in Step S1, and starts the subsequent processes of Steps S2 to S17. The CPU 11 sets "0" for an index i in Step S2, and watches for a movement completion signal, coming from the robot control device, in Step S3.

On the other hand, after transmitting the calibration start signal, the robot control device sets "0" for the index i in Step T2, and advances to Step T3, whereupon it moves the robot to an i'th instruction point (position given and stored as the instruction in the aforementioned processing (III) ), which is indicated by the index i. In the case of the two-dimensional calibration, there is only one instruction point, and the robot moves to this point. When the movement is completed, the control device of the robot transmits the movement completion signal to the image processing apparatus in Step T4, and watches for a position data request signal coming from the image processing apparatus in Step T5.

On receiving the movement completion signal from the robot control device, the CPU 11 of the image processing apparatus 10 issues a snap command to the camera 22. Then, in Step S4, the CPU 11 fetches an image of the jig into the frame memory 17, and causes the image processor 13 to detect the position and attitude of the jig from the jig image. In Step S5, the CPU 11 delivers the position data request command to the robot control device, and watches for the reception of this data.

On receiving the position data request signal in Step T5, the robot control device transmits the current position (position of the instruction point) of the robot. In the case of the three-dimensional calibration, data on the mounting position and attitude of the jig 40, assigned by the pins 43 of the jig 40, are also transmitted in Step T6.

On receiving the position data, the image processing apparatus discriminates the calibration types stored in the register R in Steps S7 to S9, and executes calibration processing (Steps S10 to S14), which corresponds to Steps S7 to S9. More specifically, camera coordinates and the sensor coordinates are combined on the basis of the jig image fetched in Step S4 and previously set jig data, and the sensor coordinates and work coordinates of the robot are combined on the basis of the position data received in Step S6.

In the case of the two-dimensional regular calibration, the value in the register R is "1," and the program proceeds from Step S7 to Step S10. In Step S10, the position of the center of the large circle 31 of the jig 30 is defined as the origin of the sensor coordinates; the straight line which connects the respective centers O and O' of the large and small circles 31 and 32 as the X axis of the sensor coordinates; the direction from the center O to the center O' as the positive direction of the X axis; and the direction at the counterclockwise rotational angle of 90° from the X axis as the Y-axis direction. Further, a pixel scale is obtained in accordance with the number of pixels between the respective centers O and O' of the circles 31 and 32 and the distance L between these circles, and data on transformation from the camera coordinates to the sensor coordinates is obtained. As a result, the two coordinate systems, the camera coordinates and the sensor coordinates, are combined.

Furthermore, data on transformation from the sensor coordinates to the work coordinates of the robot is obtained in accordance with the position data received in Step S6, and a processing for the two-dimensional regular calibration is executed to combine the two coordinate systems. Likewise, if the value in the register R is "2," a processing for the three-dimensional calibration is executed (Steps S8 and S11) to combine the camera coordinates, sensor coordinates, and robot work coordinates on the basis of the image of the jig 40, the set jig data (L, m and n), the position and the jig mounting position/attitude data received in Step S6.

Likewise, if the value in the register R is "3," the two-dimensional dot-pattern calibration is executed (Steps S9 and S12). If the value in the register R is "4," the three-dimensional dot-pattern calibration is executed (Step S13). When the calibration is finished, the calibration completion signal is transmitted to the robot control device (Steps S14 and S15). In the case of the two-dimensional calibration, this calibration processing ends. In the case of the three-dimensional calibration, "1" is added to the value of the index i in Step S16, and whether or not "3" is attained by the index i is determined in Step S17. If "3" is not attained, the program returns to Step S3.

On receiving the calibration completion signal from the image processing apparatus 10 in Step T7, the robot control device determines whether the stored calibration type is "2" or "4," that is, whether the calibration is three-dimensional or not (Step T8). If the value stored in the register is "1" or "3," that is, if the calibration is two-dimensional, the automatic calibration process is finished. In the case of the three-dimensional calibration, however, "1" added to the value of the index i in Step T9, and if "3" is not attained by the index i (Step T10), the program returns to Step T3. Then, the robot is moved to the next instruction point given by the index i, and the robot control device executes the aforesaid processings of Steps S3 to T10, while the image processing apparatus 10 executes the processings of Steps S3 to S17 for each instruction point (each camera). Thus, the calibration processing is executed for the three cameras, and the three-dimensional calibration processing ends when the index i becomes "3."

After the calibration is finished in this manner, deviations of the position and attitude of the object of operation are detected by the image processing apparatus, and are delivered as correction data to the robot. Based on these correction data, the robot control device makes operating position correction, and activates the system.

If the camera is deviated, or if the optical environment is changed during operation, increasing errors necessitate another calibration, and the calibration jig is attached to the robot. The calibration type is set in the control device of the robot or the image processing apparatus 10 and the calibration start signal is inputted. Thereupon, the robot control device and the image processing apparatus 10 start the processing shown in FIG. 1, thereby automatically effecting the calibration.

According to the present invention, as described above, individual operations which constitute the calibration control are treated as units, and the individual units can be invoked according to the programs of the image processing apparatus. Further, the system is arranged so that the calibration can also be started by means of the robot control device, and transmission, reception and operations of data associated with the calibration can be effected through communication between the image processing apparatus and the robot or some other automatic machine which utilizes the image processing apparatus. Thus, calibrating operations of different types can be performed automatically.

Once the data of the jig and the position of the automatic machine, which is fitted with a jig, which is to be photographed by the camera of the image processing apparatus, are given and stored as instructions, the automatic machine and the image processing apparatus can be operated automatically and the calibration executed in accordance with the predetermined programs by issuing the calibration command. Thus, the calibration can be executed with ease.

We claim:

1. A method of automatically calibrating a camera of an image processing apparatus which processes an image of an object of operation by combining a work coordinate system set in a control device of an automatic machine with a camera coordinate system set in the image processing apparatus, said method comprising the steps of:

(a) giving the automatic machine an instruction point for a position of the automatic machine wherein a whole body of a jig mounted on the automatic machine comes within the range of the camera of the image processing apparatus, and storing first data of the instruction point in first storage means in the automatic machine;

(b) setting, in the image processing apparatus, second data relating to an object of recognition attached to said jig, and storing said second data relating to the object of recognition in second storage means in the image processing apparatus;

(c) mounting said jig on the automatic machine;

(d) issuing a calibration start command to actuate the image processing apparatus and the automatic machine;

(e) moving the automatic machine to said instruction point based on said first data stored in said first storage means;

(f) photographing said jig with the camera, to produce image data; and (g) combining the camera coordinate system and the work coordinate system in accordance with the image data obtained by said photographing in said step (f), said second data relating to the object of recognition stored in said second storage means, and said position data of the automatic machine at said instruction point, while maintaining communication between the image processing apparatus and the automatic machine;

said steps (e), (f) and (g) being automatically repeated in response to said calibration start command issued in said step (d).

2. The automatic calibration method according to claim 1, wherein said step (b) further comprises the step of storing data of a position and attitude of said jig mounted on the automatic machine in the image processing apparatus.

3. A method of automatically calibrating a camera of an image processing apparatus for processing an image of an object of operation by combining a work coordinate system set in a control device of an automatic machine with a camera coordinate system set in the image processing apparatus, said method comprising the steps of:

(a) giving the automatic machine an instruction point for a position of the automatic machine wherein a whole body of a jig mounted on the automatic machine comes within the range of the camera of the image processing apparatus, and storing first data of the instruction point in first storage means in the automatic machine;

(b) setting, in the image processing apparatus, second data relating to an object of recognition attached to said jig based upon one of a plurality of types of calibration, and storing said second data relating to the object of recognition in second storage means in the image processing apparatus;

(c) mounting said jig based upon the one of the plurality of calibration types to be used on the automatic machine and inputting the one of the plurality of calibration types;

(d) issuing a calibration start command to actuate the image processing apparatus and the automatic machine;

(e) moving the automatic machine to said instruction point based upon said first data stored in said first storage means;

(f) photographing said jig with the camera to produce image data; and (g) combining the camera coordinate system and the work coordinate system in accordance with the image data obtained by said photographing in said step (f), said second data relating to the object of recognition stored in said second storage means, and said position data of the automatic machine at the instruction point, while maintaining communication between the image processing apparatus and the automatic machine, said steps (e), (f) and (g) being automatically repeated in response to said calibration start command issued in said step (d).

4. The automatic calibration method according to claim 3, wherein said step (b) further comprises the step of storing data of a position and attitude of said jig mounted on the automatic machine in the image processing apparatus.

5. The automatic calibration method as claimed in claim 2, wherein said step (g) further comprises the steps of:

combining the camera coordinate system and the work coordinate system based upon the mounting position and attitude data of said jig.

6. The automatic calibration method as claimed in claim 4, wherein said step (g) further comprises the steps of:

combining the camera coordinate system and the work coordinate system based upon the mounting position and attitude data of said jig.

7. The automatic calibration method as claimed in claim 3, wherein said plurality of calibration types comprise two-dimensional calibration and three-dimensional calibration.

8. The automatic calibration method as claimed in claim 1, wherein the object of recognition comprises a pattern which includes a first circle of a first size and a second circle of a second size different than said first size.

9. The automatic calibration method as claimed in claim 1, wherein the object of recognition comprises a pattern which includes a first circle of a first size and a plurality of second circles of a second size different than said first size and arranged in a lattice formation.

* * * * *

UNITED STATES PATENT AND TRADEMARK OFFICE
CERTIFICATE OF CORRECTION

PATENT NO. : 5,471,312
DATED : November 28, 1995
INVENTOR(S) : Atsushi WATANABE et al.

It is certified that error appears in the above-indentified patent and that said Letters Patent is hereby corrected as shown below:

Column 3, line 21, after "FIG. 2" insert --a--; and line 23, delete "of".

Signed and Sealed this

Twenty-seventh Day of February, 1996

Attest:

BRUCE LEHMAN

*Attesting Officer*     Commissioner of Patents and Trademarks